United States Patent
Caimi et al.

(10) Patent No.: US 10,217,544 B2
(45) Date of Patent: Feb. 26, 2019

(54) ENERGY CABLE HAVING A COLD-STRIPPABLE SEMICONDUCTIVE LAYER

(71) Applicant: PRYSMIAN S.p.A., Milan (IT)

(72) Inventors: Luigi Caimi, Milan (IT); Vincenzo Crisci, Milan (IT); Alberto Bareggi, Milan (IT)

(73) Assignee: PRYSMIAN S.p.A, Milan (IT)

( * ) Notice: Subject to any disclaimer, the term of this patent is extended or adjusted under 35 U.S.C. 154(b) by 53 days.

(21) Appl. No.: 15/536,515

(22) PCT Filed: Dec. 17, 2014

(86) PCT No.: PCT/IB2014/067031
§ 371 (c)(1),
(2) Date: Jun. 15, 2017

(87) PCT Pub. No.: WO2016/097819
PCT Pub. Date: Jun. 23, 2016

(65) Prior Publication Data
US 2017/0330646 A1    Nov. 16, 2017

(51) Int. Cl.
*H01B 3/20* (2006.01)
*H01B 3/44* (2006.01)
(Continued)

(52) U.S. Cl.
CPC .......... *H01B 7/02* (2013.01); *B29C 47/0016* (2013.01); *B29C 47/02* (2013.01); *B29C 47/065* (2013.01);
(Continued)

(58) Field of Classification Search
CPC ................ H01B 7/02; C08L 2203/202; C08L 2205/025; C08L 2207/02; C08L 23/0853
See application file for complete search history.

(56) References Cited

U.S. PATENT DOCUMENTS

| 2006/0124341 A1* | 6/2006 | Perego | H01B 3/20 174/110 R |
| 2007/0012468 A1* | 1/2007 | Han | H01B 1/24 174/34 |

(Continued)

FOREIGN PATENT DOCUMENTS

| EP | 2 128 194 A1 | 12/2009 |
| EP | 2 128 195 A1 | 12/2009 |

(Continued)

OTHER PUBLICATIONS

International Search Report dated Sep. 9, 2015 in PCT/IB2014/067031 filed Dec. 17, 2014.

*Primary Examiner* — Timothy J Thompson
*Assistant Examiner* — Rhadames Alonzo Miller
(74) *Attorney, Agent, or Firm* — Oblon, McClelland, Maier & Neustadt, L.L.P.

(57) ABSTRACT

Energy cable comprising, from the interior to the exterior, an electrical conductor, an inner semiconductive layer, an electrically insulating layer made from a thermoplastic material in admixture with a dielectric fluid, and an outer semiconductive layer, wherein the outer semiconductive layer comprises: (i) from 55 wt % to 90 wt % of a copolymer of ethylene with at least one ester comonomer having an ethylenic unsaturation; (ii) from 10 wt % to 45 wt % of a propylene copolymer with at least one olefin comonomer selected from ethylene and an α-olefin other than propylene, said copolymer having a melting point of from 145° C. to 170° C. and a melting enthalpy of from 40 J/g to 80 J/g; (iii) at least one conductive filler; (iv) at least one dielectric fluid; the amounts of (i) and (ii) being expressed with respect to the total weight of the polymeric components of the layer. The outer semiconductive layer is cold-strippable, having an adhesion with the underlying thermoplastic insulating layer which can be tuned so as to obtain a suitable balance (Continued)

between strippability at a temperature ranging from about 0° C. to about 40° C., without applying heat, and stable adhesion with the insulating layer during the cable lifespan.

15 Claims, 2 Drawing Sheets

(51) Int. Cl.
    *H01B 7/02* (2006.01)
    *B29C 47/00* (2006.01)
    *B29C 47/02* (2006.01)
    *B29C 47/06* (2006.01)
    *B29K 23/00* (2006.01)
    *B29L 31/34* (2006.01)
    *C08L 23/08* (2006.01)
    *C08L 23/10* (2006.01)
    *C08L 23/16* (2006.01)

(52) U.S. Cl.
    CPC ............ *C08L 23/08* (2013.01); *C08L 23/0815* (2013.01); *C08L 23/0853* (2013.01); *C08L 23/10* (2013.01); *C08L 23/16* (2013.01); *H01B 3/20* (2013.01); *H01B 3/441* (2013.01); *H01B 3/447* (2013.01); *B29K 2023/06* (2013.01); *B29K 2023/12* (2013.01); *B29L 2031/3462* (2013.01); *C08L 2203/20* (2013.01); *C08L 2203/202* (2013.01); *C08L 2205/025* (2013.01); *C08L 2205/03* (2013.01); *C08L 2205/035* (2013.01); *C08L 2207/02* (2013.01)

(56) References Cited

U.S. PATENT DOCUMENTS

| | | | | |
|---|---|---|---|---|
| 2007/0051450 | A1* | 3/2007 | Donazzi ................. | H01B 7/189 156/54 |
| 2007/0272426 | A1* | 11/2007 | Dell'Anna ............... | H01B 3/20 174/250 |
| 2009/0200059 | A1* | 8/2009 | Cinquemani .......... | H01B 9/025 174/113 R |
| 2010/0163269 | A1* | 7/2010 | Perego ................... | H01B 3/441 174/107 |
| 2011/0114365 | A1* | 5/2011 | Torgersen ........... | C08L 23/0869 174/120 SC |
| 2011/0162868 | A1* | 7/2011 | Torgersen ........... | C08L 23/0846 174/120 SC |
| 2013/0032376 | A1* | 2/2013 | Fagrell ................ | C08L 23/0846 174/120 SC |
| 2013/0133922 | A1* | 5/2013 | Steffl ....................... | C08L 23/14 |
| 2013/0344329 | A1* | 12/2013 | Perego ................... | H01B 3/22 428/379 |
| 2014/0227518 | A1* | 8/2014 | Kishimoto .............. | C08L 23/10 428/394 |

FOREIGN PATENT DOCUMENTS

| | | |
|---|---|---|
| EP | 2 365 010 A1 | 9/2011 |
| EP | 2 720 234 A1 | 4/2014 |
| WO | WO 2005/031761 A1 | 4/2005 |

* cited by examiner

ENERGY CABLE HAVING A COLD-STRIPPABLE SEMICONDUCTIVE LAYER

BACKGROUND OF THE INVENTION

The present invention relates to an energy cable having a cold-strippable semiconductive layer. More particularly, the present invention relates to an energy cable having a thermoplastic insulating layer in contact with a cold-strippable semiconductive outer layer.

Cables for transporting electric energy generally include at least one cable core. The cable core is usually formed by at least one conductor sequentially covered by an inner polymeric layer having semiconducting properties, an intermediate polymeric layer having electrically insulating properties, an outer polymeric layer having semiconducting properties. Cables for transporting medium or high voltage electric energy generally include at least one cable core surrounded by at least one screen layer, typically made of metal or of metal and polymeric material. The screen layer can be made in the form of wires (braids), of a tape helically wound around the cable core or a sheet longitudinally wrapped around the cable core.

The polymeric layers surrounding the conductor/s are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during continuous use and with current overload.

For various reasons including to address requirements for materials which should not be harmful to the environment both during production and during use, and which should be recyclable at the end of the cable life, energy cables have been recently developed having a cable core made from thermoplastic materials, i.e. polymeric materials which are not crosslinked and thus can be recycled at the end of the cable life.

In this respect, electrical cables comprising at least one coating layer, for example the insulation layer, based on a polypropylene matrix intimately admixed with a dielectric fluid are known and disclosed in WO 02/03398, WO 02/27731, WO 04/066317, WO 04/066318, WO 07/048422, WO2011/092533 and WO 08/058572. The polypropylene matrix useful for this kind of cables comprises a polypropylene homopolymer or copolymer or both, characterized by a relatively low crystallinity such to provide the cable with the suitable flexibility, but not to impair the mechanical properties and thermopressure resistance at the cable operative and overload temperatures. Performance of the cable coating, especially of the cable insulating layer, is also affected by the presence of the dielectric fluid intimately admixed with said polypropylene matrix. The dielectric fluid should not affect the mentioned mechanical properties and thermopressure resistance and should be such to be intimately and homogeneously mixed with the polymeric matrix.

Moreover, for some applications, it is required to provide energy cables in the medium and high voltage range having a cold-strippable semiconductive layer, i.e. an outer semiconductive layer which can be removed during cable installation and jointing without applying heat (the heating procedure requires the presence of further apparatus in situ and may cause damages to the cable) and without challenging the integrity of the underlying layer or leaving residues thereon.

The capability of being cold-strippable should not be detrimental for the adhesion between the semiconductive layer and the insulating layer, since a close and stable bonding between those layers during the cable lifespan prevents partial delamination of the layers with possible formation of micro-voids, which could cause the insurgence of partial discharge phenomena.

US 2006/0182961 (Dow Chemical) relates a semiconductive power cable composition comprising a mixture of (a) a high temperature polymer and a soft polymer, and (b) a conductive filler wherein a semiconductive cable layer prepared from the composition strippably adheres to a second cable layer. Suitable high-temperature polymers include polypropylenes. The high temperature polymer is preferably in the composition in an amount less than 50 weight percent. Suitable soft polymers include polyethylenes and polypropylenes. Polyethylenes include copolymer of ethylene and an unsaturated ester such as a vinyl ester (e.g., vinyl acetate). Suitable polypropylenes include copolymers of propylene and other olefins. A curing agent may be present in the semiconductive composition. The semiconductive polymer base material does not contain a dielectric fluid.

WO 2013/120582 teaches that common concept for making a semi-conductive layer strippable is to increase the polarity of the semi-conductive layer. This document relates to a semi-conducting shield layer of a wire or cable comprising: (A) an ethylene copolymer comprising polar co-monomer units; (B) an olefin copolymer; and (C) a conductive filler; wherein the olefin homo- or copolymer (B) has a degree of crystallinity below 20%. The olefin copolymer (B) can be an ethylene-propylene copolymer. The co-polymer (B) is preferably present in the composition in an amount between 5 and 25% based on the total weight of the polymer composition. The polar co-monomers are selected from the group consisting of acrylic acids, methacrylic acids, acrylates, methacrylates, and vinyl esters. The amount of ethylene copolymer comprising polar co-monomer units is from 30 to 75 wt % of the total polymer composition. The semiconductive polymer base material does not contain a dielectric fluid.

SUMMARY OF THE INVENTION

The Applicant has faced the problem of providing energy cables in the medium and high voltage range having, as electrically insulating layer, a thermoplastic coating, based on a propylene polymer or copolymer, or mixtures thereof, intimately admixed with a dielectric fluid, and a cold-strippable semiconductive layer. More specifically, the technical problem faced by the Applicant is that of providing a cold-strippable semiconductive layer having an adhesion with the underlying thermoplastic insulating layer which can be tuned so as to obtain a suitable balance between strippability at a temperature ranging from about 0° C. to about 40° C., without applying heat, and stable adhesion with the insulating layer during the cable lifespan.

The above balance of properties should take into account the presence of the dielectric fluid that may stem from the insulating layer. The presence of fluid intimately admixed into the insulating layer can affect the adhesion between the semiconductive layer and the insulating layer.

For limiting the dielectric fluid migration from the insulating layer, some of the same or similar dielectric fluid can also be admixed with the semiconductive layer composition.

The addition of dielectric fluid to the polymeric material forming the semiconductive layer, also exerting a plasticizing effect, should be carefully considered because it may negatively influence the interaction of the semiconducting filler, usually conductive carbon black, with the polymer matrix, thus causing an uneven dispersion of the filler itself.

The Applicant has found that the above technical problem and others can be solved by providing an energy cable, having an insulating layer made from a thermoplastic material in admixture with a dielectric fluid, and an outer semiconductive layer, comprising a conductive filler and a dielectric fluid, made of a polymer mixture based on a polar polymer as major component and, as minor component, a propylene copolymer having a crystallinity as defined by the melting enthalpy of the same.

Therefore, according to a first aspect, the present invention relates to an energy cable comprising, from the interior to the exterior, an electrical conductor, an inner semiconductive layer, an electrically insulating layer made from a thermoplastic material in admixture with a dielectric fluid, and an outer semiconductive layer, wherein the outer semiconductive layer comprises:

(i) from 55 wt % to 90 wt % of a copolymer of ethylene with at least one ester comonomer having an ethylenic unsaturation;

(ii) from 10 wt % to 45 wt % of a propylene copolymer with at least one olefin comonomer selected from ethylene and an α-olefin other than propylene, said copolymer having a melting point of from 145° C. to 170° C. and a melting enthalpy of from 40 J/g to 80 J/g;

(iii) at least one conductive filler;

(iv) at least one dielectric fluid;

the amounts of (i) and (ii) being expressed with respect to the total weight of the polymeric components of the layer.

For the purpose of the present description and of the claims that follow, except where otherwise indicated, all numbers expressing amounts, quantities, percentages, and so forth, are to be understood as being modified in all instances by the term "about". Moreover, all ranges include any combination of the maximum and minimum points disclosed and include any intermediate ranges therein, which may or may not be specifically enumerated herein.

In the present description and in the subsequent claims, as "conductor" it is meant an electrically conducting element usually made from a metallic material, preferably aluminium, copper or alloys thereof, or aluminium/copper composites, either as a rod or as a stranded multi-wire.

For the purposes of the invention the term "medium voltage" generally means a voltage of between 1 kV and 35 kV, whereas "high voltage" means voltages higher than 35 kV.

As "electrically insulating layer" it is meant a covering layer made of a material having insulating properties, namely having a dielectric rigidity (dielectric breakdown strength) of at least 5 kV/mm, preferably greater than 10 kV/mm.

As "semiconductive layer" it is meant a covering layer made of a material having a volumetric resistivity value, at room temperature, of less than 500 Ω·m, preferably less than 20 Ω·m; typically a semiconductive layer is made of a polymeric matrix added with, e.g., conductive carbon black.

As "melting point" of the propylene copolymer (ii) it is meant the highest temperature attributable to propylene sequences, determined by differential scanning calorimetry (DSC).

As "melting enthalpy" of the propylene copolymer (ii) it is meant the heat energy (expressed as J/g) required for melting (breaking down) the crystalline lattice. It is calculated from DSC curves by integrating the area defined by the melting peak and the baseline before and after the melting peak.

As "crystallinity" it is meant the amount of crystalline phase or region in a polymer with respect to amorphous content. The polymer crystallinity is determined by DSC analysis by quantifying the heat associated with the polymer melting. This heat is reported as percent crystallinity by normalizing the observed melting enthalpy to that of a 100% crystalline sample of the same polymer, as disclosed, for example, in the publication from TA Instruments "Thermal Analysis Application Brief—Determination of Polymer Crystallinity by DSC—Number TA-123" (available on the web at http://www.tainstruments.co.jp/application/pdf/Thermal_Library/Applications_Briefs/TA123.PDF).

As regards the ethylene copolymer (i), which is a polar polymer, it is preferably selected from copolymers of ethylene with at least one ester comonomer selected from: $C_1$-$C_8$ (preferably $C_1$-$C_4$) alkyl acrylates, $C_1$-$C_8$ (preferably $C_1$-$C_4$) alkyl methacrylates, and vinyl $C_2$-$C_8$ (preferably $C_2$-$C_5$) carboxylates. The ester comonomer can be present in the copolymer (i) in an amount from 10 wt % to 50 wt %, preferably from 15 wt % to 40 wt %. Examples of $C_1$-$C_8$ alkyl acrylates and methacrylates are: ethyl acrylate, methyl acrylate, methyl methacrylate, tert-butyl acrylate, n-butyl acrylate, n-butyl methacrylate, 2-ethylhexyl acrylate, and the like. Examples of vinyl $C_2$-$C_8$ carboxylates are: vinylacetate, vinylpropionate, vinylbutanoate, and the like. Particularly preferred as ethylene copolymers (i) are: ethylene-vinylacetate copolymers (EVA) and ethylene-n-butylacrylate copolymers (EBA).

Preferably, the ethylene copolymer (i) is present in the outer semiconductive layer in an amount of from 60 wt % to 80 wt %.

Preferably, the ethylene copolymer (i) has a melt flow rate (MFR) of from 0.5 to 10 g/10 min (190° C., 2.16 kg according to ASTM D1238 or ISO 1133).

Preferably, the propylene copolymer (ii) is present in the outer semiconductive layer in an amount of from 20 wt % to 40 wt %.

The propylene copolymer (ii) can be a mixture of propylene copolymers.

Preferably, the propylene copolymer (ii) has a melting point of from 145° C. to 160° C.

Advantageously, the propylene copolymer (ii) has a melting enthalpy of from 50 to 70 J/g.

Advantageously, the propylene copolymer (ii) contains a crystallinity (or crystalline phase) in an amount of from 80 wt % to 95 wt % with respect to the weight of the propylene copolymer (ii).

Preferably, the propylene copolymer (ii) is selected from heterophasic propylene copolymers, namely from copolymers in which elastomeric domains, e.g. of ethylene-propylene elastomer (EPR), are dispersed in a propylene homopolymer or copolymer matrix.

It should be noted that the above values of melting point and melting enthalpy are referred to the propylene copolymer (ii) both when it is made of a single copolymer and also when it is made of a mixture of different propylene copolymers. The above values are determined by DSC (Differential Scanning calorimetry) analysis of the single propylene copolymer or of the mixture of different propylene copolymers, without separating the contribution of each polymer forming the mixture.

More preferably, the propylene copolymer (ii) is a mixture of:

(iia) a propylene copolymer, preferably a random propylene copolymer, having a melting enthalpy of from 50 to 90 J/g; and (iib) a heterophasic propylene copolymer having a melting enthalpy up to 35 J/g and comprising an elastomeric phase in an amount equal to or greater than 30 wt % with respect to the total weight of the copolymer (iib).

Preferably, the mixture of (iia) and (iib) contains from 35 to 85 wt %, more preferably from 40 to 80 wt %, of the propylene copolymer (iia), and from 15 to 65 wt %, more preferably from 20 to 60 wt %, of the heterophasic propylene copolymer (iib), the percentages being expressed with respect to the total weight of (iia) and (iib).

The above mixture of (iia) and (iib) is preferred since it allows properly modulating the characteristics of the polymeric material forming the semiconductive layer, so as to achieve the desired balance of properties in terms of adhesion with the underlying insulating layer and of cold strippability. Without being bound to any scientific interpretation of the present invention, it is believed that the above balance of properties is mainly influenced by the crystallinity (amount of crystalline phase) present in the propylene copolymer (ii), which can be more easily controlled by combining two different propylene copolymers (iia) and (iib) as described above.

As regards the conductive filler (iii), it is preferably a carbon black filler. Preferably, the carbon black filler has a surface area BET greater than 20 $m^2/g$, for example of from 40 and 500 $m^2/g$.

Preferably, the conductive filler (iii) is present in an amount so as to obtain a semiconductive layer having a volumetric resistivity value, at room temperature, of less than 500 Ω·m, preferably less than 20 Ω·m. Typically, the amount of carbon black ranges from 1 to 50% by weight, preferably from 3 to 30% by weight, relative to the weight of the polymer base.

As regards the dielectric fluid (iv), it is generally compatible with the polymeric materials forming the semiconductive layer. "Compatible" means that the chemical composition of the fluid and of the polymer material is such as to result into a substantially homogeneous dispersion of the dielectric fluid into the polymer material upon mixing the fluid into the polymer, similarly to a plasticizer.

Advantageously, the weight ratio between the at least one dielectric fluid (iv) and the total weight of the copolymers (i) and (ii) may be from 1:99 to 25:75, preferably from 2:98 to 15:85.

According to a preferred embodiment, the dielectric fluid has a melting point or a pour point of from −130° C. to +80° C. The melting point may be determined by known techniques such as, for example, by Differential Scanning calorimetry (DSC) analysis.

It has also to be noticed that the use of a dielectric fluid with a relatively low melting point or low pour point—such that the dielectric fluid is liquid at room temperature or can be melted by a mild heating, for example at 80° C.—allows an easy handling of the dielectric fluid which may be melted with no need of additional and complex manufacturing steps (e.g. a melting step of the dielectric fluid) and/or apparatuses for admixing the liquid with the polymer material.

According to a further preferred embodiment, the dielectric fluid has a predetermined viscosity in order to prevent fast diffusion of the liquid within the insulating layer and hence its outward migration, as well as to enable the dielectric fluid to be easily fed and mixed into the thermoplastic polymer material. Generally, the dielectric fluid of the invention has a viscosity, at 40° C., of from 5 cSt to 500 cSt, preferably of from 10 cSt to 100 cSt (measured according to ASTM D445-03).

For example, the dielectric fluid is selected from mineral oils, for example, naphthenic oils, aromatic oils, paraffinic oils, said mineral oils optionally containing at least one heteroatom selected from oxygen, nitrogen or sulfur; liquid paraffins; vegetable oils, for example, soybean oil, linseed oil, castor oil; oligomeric aromatic polyolefins; paraffinic waxes, for example, polyethylene waxes, polypropylene waxes; synthetic oils, for example, silicone oils, alkyl benzenes (for example, dodecylbenzene, di(octylbenzyl)toluene), aliphatic esters (for example, tetraesters of pentaerythritol, esters of sebacic acid, phthalic esters), olefin oligomers (for example, optionally hydrogenated polybutenes or polyisobutenes); or mixtures thereof. Paraffinic oils and naphthenic oils are particularly preferred.

Polyaromatic oils could also be employed though their use is questionable as potentially hazardous to health and environment.

Mineral oils as dielectric fluid can comprise polar compound/s. The amount of polar compound/s advantageously is lower than 5 wt %. Such a low amount of polar compounds allows obtaining low dielectric losses. The amount of polar compounds of the dielectric fluid may be determined according to ASTM D2007-02.

Alternatively, the dielectric fluid can comprise at least one alkylaryl hydrocarbon having the structural formula (I):

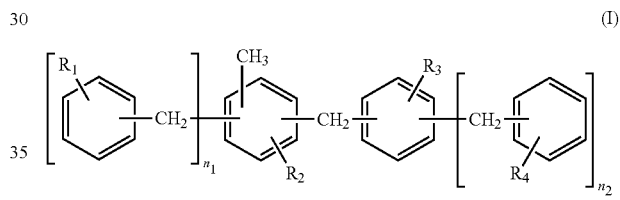

(I)

wherein:

$R_1$, $R_2$, $R_3$ and $R_4$, equal or different, are hydrogen or methyl;

n1 and n2, equal or different, are zero, 1 or 2, with the proviso that the sum n1+n2 is less than or equal to 3.

Suitable dielectric fluids are described, e.g., in WO 02/03398, WO 02/27731, WO 04/066318 and WO 08/058572, all in the Applicant's name.

Preferably, the electrically insulating layer of the energy cable according to the present invention comprises a thermoplastic material in admixture with a dielectric fluid, wherein the thermoplastic material is selected from:

at least one copolymer (a1) of propylene with at least one olefin comonomer selected from ethylene and an α-olefin other than propylene, said copolymer having a melting point greater than or equal to 130° C. and a melting enthalpy of from 20 J/g to 90 J/g;

a blend of at least one copolymer (a1) with at least one copolymer (a2) of ethylene with at least one α-olefin, said copolymer (a2) having a melting enthalpy of from 0 J/g to 70 J/g;

a blend of at least one propylene homopolymer with at least one copolymer (a1) or copolymer (a2);

at least one of copolymer (a1) and copolymer (a2) being a heterophasic copolymer.

Suitable materials for the electrically insulating layer are described, e.g., in WO 02/03398, WO 04/066318, WO 07/048422, WO2011/092533 and WO2013/171550, all in the Applicant's name.

The dielectric fluid in the electrically insulating layer may be selected from the products described above for the outer semiconductive layer.

As regards the inner semiconductive layer of the energy cable according to the present invention, it may have the same composition of the outer semiconductive layer as described above. However, since for the inner semiconductive layer cold-strippability is not required, a composition similar or identical to the insulating layer may be used, of course added with a conductive filler to make it semiconductive as described above.

The outer semiconducting layer of the cable of the invention can further comprise additives such as a processing aid and an antioxidant selected among those known to the skilled person.

BRIEF DESCRIPTION OF THE DRAWING

Further characteristics will be apparent from the detailed description given hereinafter with reference to the accompanying drawings, in which.

DETAILED DESCRIPTION OF THE PREFERRED EMBODIMENTS

Figure 1:
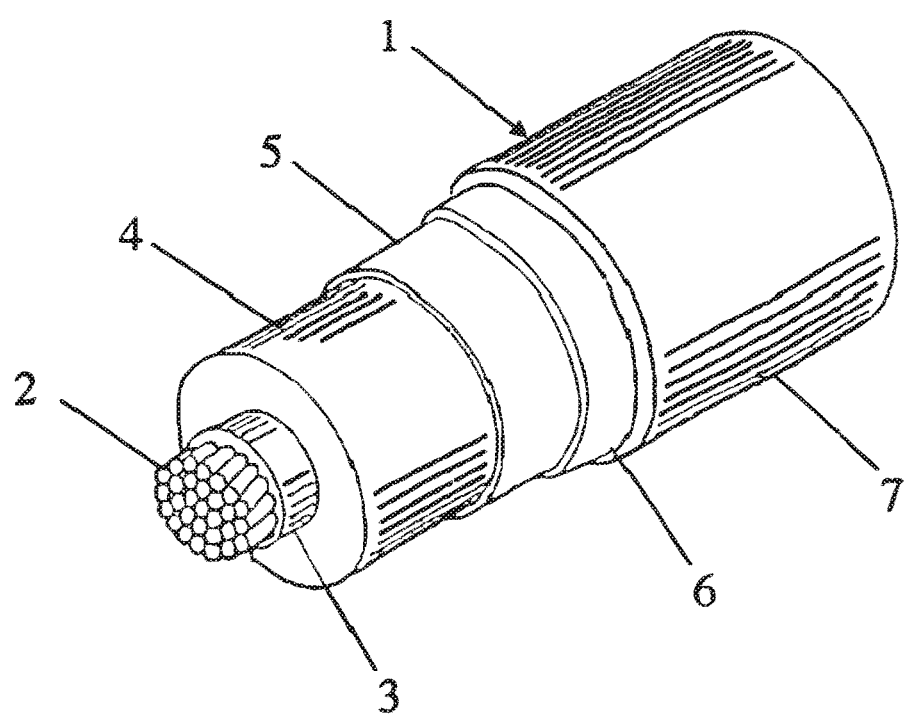
FIG. 1 is a perspective view of an energy cable, particularly suitable for medium or high voltage, according to the invention.

In FIG. 1, the cable (1) comprises a conductor (2), an inner layer with semiconductive properties (3), an intermediate layer with insulating properties (4), an outer layer with semiconductive properties (5) made according to the present invention, a metal screen layer (6) and a sheath (7).

The conductor (2) generally consists of metal wires, preferably of copper or aluminium or alloys thereof, stranded together by conventional methods, or of a solid aluminium or copper rod. The insulating layer (4) and the semiconductive layers (3) and (5) have the compositions as described above.

Around the outer semiconductive layer (5), a metal screen layer (6) is usually positioned, made of electrically conducting wires or strips helically wound around the cable core or of an electrically conducting tape longitudinally wrapped and overlapped (preferably glued) onto the underlying layer. The electrically conducting material of said wires, strips or tape is usually copper or aluminium or alloys thereof.

The screen layer (6) may be covered by a sheath (7), generally made from a polyolefin, usually polyethylene.

The cable can be also provided with a protective structure (not shown in FIG. 1) the main purpose of which is to mechanically protect the cable against impacts or compressions. This protective structure may be, for example, a metal reinforcement or a layer of expanded polymer as described in WO 98/52197 in the name of the Applicant.

The cable according to the present invention may be manufactured in accordance with known methods, for example by extrusion of the various layers around the central conductor. The extrusion of two or more layers is advantageously carried out in a single pass, for example by the tandem method in which individual extruders are arranged in series, or by co-extrusion with a multiple extrusion head. The screen layer is then applied around the so produced cable core. Finally, the sheath according to the present invention is applied, usually by a further extrusion step.

As for the semiconducting layer in particular, the extrusion step is preceded by a mixing step carried out by a using buss kneader machine or a twin screw compounding machinery according to the known technology to process thermoplastic materials charged with carbon black.

FIG. 1 shows only one embodiment of a cable according to the invention. Suitable modifications can be made to this embodiment according to specific technical needs and application requirements without departing from the scope of the invention.

The following examples are provided to further illustrate the invention.

EXAMPLES 1-3

Semiconductive compositions according to the present invention were produced by continuous mixing of the components in the amounts as reported in Table 1 using a Buss kneader machine.

Six cable samples were produced with the outer semiconducting layer composition indicated in Table 1. The samples consisted of stranded conductor with size 185 mm$^2$ (Examples 1, 4, 5, 6) or 240 mm$^2$ (Examples 3, 4), covered with the following extruded layers: an inner semiconducting layer (bonded version) having a 0.5 mm thickness; an insulation layer having a 4.3 mm thickness; an outer semiconducting layer having a 0.6 mm thickness.

The insulation layer used for all the samples was made according to the following recipe (wt % with respect to the total weight of the mixture): 71 wt % of PP heterophasic (the same of Table 1); 23 wt % of PP random (the same of Table 1); 5.4 wt % of dielectric fluid (the same of Table 1); 0.6% of an antioxidant.

The samples were produced by extruding the three layers with three separate single screw extruders connected to a triple extrusion crosshead, able to provide simultaneous application of the three layers around the conductor. After the extrusion of the three thermoplastic layers, the cable was cooled by a cooling trough with water kept at room temperature and subsequently collected on a drum for testing.

For each cable sample, the stripping force for the outer semiconductive layer was measured according to standard UNI HD 605, S2 (2008), page 33-37, at different temperatures (0° C., 25° C. and 40° C.). The results are reported in Table 1.

TABLE 1

| | EXAMPLE | | | | | |
|---|---|---|---|---|---|---|
| | 1 | 2 | 3 | 4(*) | 5(*) | 6(*) |
| EVA | 75 | 68 | 62 | 80 | 68 | 70 |
| PP random | 18.6 | 17 | 16 | 20 | 32 | — |
| PP heterophasic | 6.4 | 15 | 22 | — | — | 30 |
| Carbon black | 24 | 24 | 24 | 24 | 24 | 24 |
| Dielectric fluid | 6 | 6 | 6 | 6 | 6 | 6 |
| Other additives | 3.5 | 4 | 2.5 | 4 | 3 | 4 |
| $\Delta H_m$ PP (J/g) | 67 | 56 | 50 | 84 | 84 | 30 |
| $T_m$ PP (° C.) | 148 | 150 | 153 | 146 | 146 | 167 |
| Stripping force @ 0° C. (N/10 mm) | 28 | n.d. | n.d. | 12 | bonded | n.d. |
| Stripping force @ 25° C. (N/10 mm) | 16 | 18.7 | 22 | 6 | bonded | bonded |

TABLE 1-continued

| | EXAMPLE | | | | | |
|---|---|---|---|---|---|---|
| | 1 | 2 | 3 | 4(*) | 5(*) | 6(*) |
| Stripping force @ 40° C. (N/10 mm) | 6 | 8.4 | 12 | 2 | bonded | n.d. |

(*)comparative
n.d.: not determined

The amounts in the table are expressed as weight % with respect to the total weight of the polymeric materials (equivalent to phr).

Figure 2:
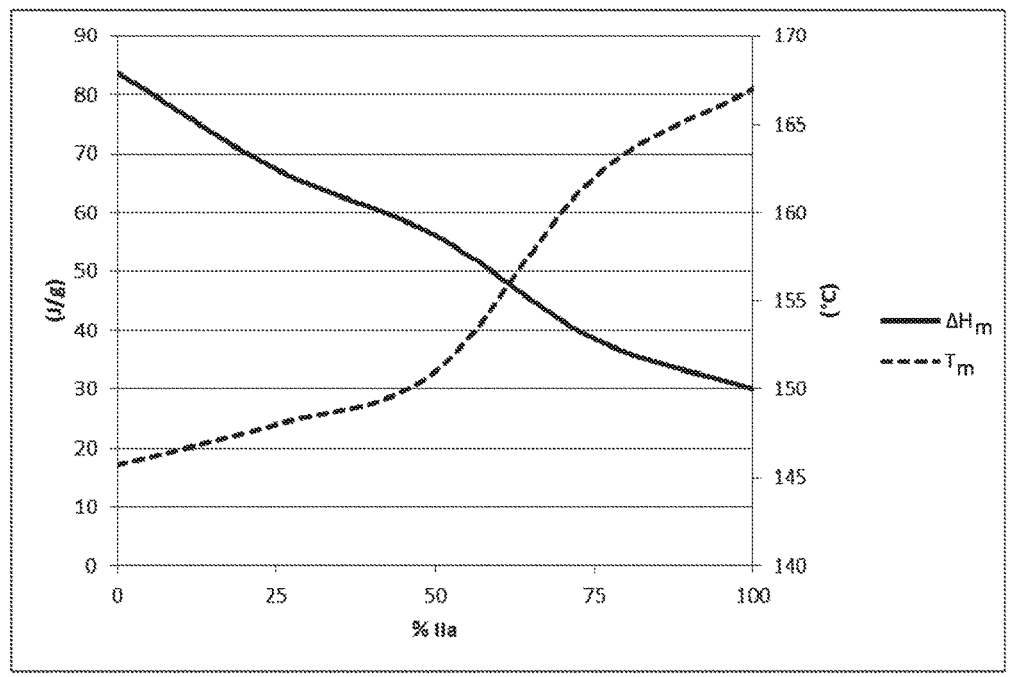
FIG. 2 shows variation of melting enthalpy and melting temperature of a mixture of copolymers (iia) and (iib) used in the examples, with respect to the weight percentage of copolymer (iia) in the mixture.

EVA: ethylene/vinylacetate copolymer, containing 28% by weight of vinylacetate, having: density=0.951 g/cm$^3$—ISO 1183; Melt Index (190° C./2.16 kg)=3 g/10 min—ISO 1133; melting point (DSC)=73° C. —ISO 3146; Vicat softening point=49° C. —ISO 306;

PP random: propylene-ethylene copolymer, having: melting enthalpy ($\Delta H_m$)=84 J/g; melting point ($T_m$)=146° C., MFR (230° C./2, 16 Kg)=1.8 g/10 min—ISO 1133;

PP heterophasic: heterophasic propylene-ethylene copolymer, having: melting enthalpy ($\Delta H_m$)=30 J/g; melting point ($T_m$)=167° C.; MFR (230° C./2, 16 Kg—ISO 1133)=0.8 g/10 min;

Conductive carbon black, having: BET 65 m$^2$/g; DBP 190 ml/100 g;

Dielectric fluid: naphthenic oil, having: 3 wt % aromatic carbon atoms, 41 wt % naphthenic carbon atoms, 56 wt % paraffinic carbon atoms, 0.1 wt % polar compounds;

Other additives: antioxidants, processing aids;

FIG. 2 shows the variation of melting enthalpy ($\Delta H_m$ PP) and melting temperature ($T_m$ PP) of the PP mixture by adding increasing amounts of the PP random (iia) to the PP heterophasic (iib) used in the above examples.

As regards Examples 1-3 according to the invention, it is to be noted that the stripping force of the outer semiconductive layer is within the range from 5 to 30 N/10 mm at all the test temperatures (from 0° C. to 40° C.), which is what commonly considered to comply with the cable standard requirements (like those of the above-mentioned standard UNI HD 605, S2) for a cold-strippable semiconductive layer.

Conversely, comparative Examples 4 and 5—where the melting enthalpy of the propylene copolymer is greater than the claimed range—are not acceptable in terms of cold strippability: on one side Example 4 had a stripping force which is too low, showing a scarce adhesion to the insulating layer especially at 40° C., while on the other side Example 5 was not cold strippable, being firmly bonded to the insulating layer.

As to comparative Example 6—where the melting enthalpy of the propylene copolymer is lower than the claimed range—are not acceptable as the outer semiconducting layer is firmly bonded to the insulating layer at room temperature.

The behavior of the outer semiconducting layer of the sample cables depends not only on the melting enthalpy of the propylene copolymer (ii) but also on the amount of the ethylene copolymer (i).

The invention claimed is:

1. An energy cable comprising, from the interior to the exterior, an electrical conductor, an inner semiconductive layer, an electrically insulating layer made from a thermoplastic material in admixture with a dielectric fluid, and an outer semiconductive layer, wherein the outer semiconductive layer comprises:
   (i) from 55 wt % to 90 wt % of at least one copolymer of ethylene with at least one ester comonomer having an ethylenic unsaturation;
   (ii) from 10 wt % to 45 wt % of a copolymer of propylene with at least one olefin comonomer selected from ethylene and an α-olefin other than propylene, said copolymer having a melting point of from 145° C. to 170° C. and a melting enthalpy of from 40 J/g to 80 J/g;
   (iii) at least one conductive filler;
   (iv) at least one dielectric fluid;
   the amounts of (i) and (ii) being expressed with respect to the total weight of the polymeric components of the layer.

2. Energy cable according to claim 1, wherein the ethylene copolymer (i) is selected from copolymers of ethylene with at least one ester comonomer selected from: $C_1$-$C_8$ alkyl acrylates, $C_1$-$C_8$ alkyl methacrylates, and vinyl $C_2$-$C_8$ carboxylates.

3. Energy cable according to claim 1, wherein the ester comonomer is present in the copolymer (i) in an amount of from 10 wt % to 50 wt %.

4. Energy cable according to claim 1, wherein the ethylene copolymer (i) is selected from: ethylene-vinylacetate copolymers and ethylene-n-butylacrylate copolymers.

5. Energy cable according to claim 1, wherein the ethylene copolymer (i) is present in an amount of from 60 wt % to 80 wt %.

6. Energy cable according to claim 1, wherein the ethylene copolymer (i) has a melt flow rate (MFR) of from 0.5 to 10 g/10 min (190° C., 2.16 kg according to ASTM D1238 or ISO 1133).

7. Energy cable according to claim 1, wherein the propylene copolymer (ii) is present in the outer semiconductive layer in an amount of from 20 wt % to 40 wt %.

8. Energy cable according to claim 1, wherein the propylene copolymer (ii) has a melting point of from 145° C. to 160° C.

9. Energy cable according to claim 1, wherein the propylene copolymer (ii) has a melting enthalpy of from 50 to 70 J/g.

10. Energy cable according to claim 1, wherein the propylene copolymer (ii) contains a crystalline phase in an amount of from 80 wt % to 95 wt % with respect to the weight of the propylene copolymer (ii).

11. Energy cable according to claim 1, wherein the propylene copolymer (ii) is a mixture of:
   (iia) a propylene copolymer having a melting enthalpy of from 50 to 90 J/g; and
   (iib) a heterophasic propylene copolymer having a melting enthalpy up to 35 J/g and comprising an elastomeric phase in an amount equal to or greater than 30 wt % with respect to the total weight of the copolymer (iib).

12. Energy cable according to claim 11, wherein the propylene copolymer (iia) is a random propylene copolymer.

13. Energy cable according to claim 11, wherein the mixture of (iia) and (iib) contains from 35 to 85 wt % of the propylene copolymer (iia) and from 15 to 65 wt %, of the heterophasic propylene copolymer (iib), the percentages being expressed with respect to the total weight of (iia) and (iib).

14. Energy cable according to claim 11, wherein the mixture of (iia) and (iib) contains from 40 to 80 wt % of the propylene copolymer (iia) and from 20 to 60 wt % of the heterophasic propylene copolymer (iib), the percentages being expressed with respect to the total weight of (iia) and (iib).

15. Energy cable according to claim 1, wherein the weight ratio between the at least one dielectric fluid (iv) and the total weight of the copolymers (i) and (ii) may be from 2:98 to 15:85.

* * * * *